(12) United States Patent
Ellsworth et al.

(10) Patent No.: US 7,720,813 B2
(45) Date of Patent: May 18, 2010

(54) APPARATUS, SYSTEM, AND METHOD FOR THE AUTONOMIC VIRTUALIZATION OF A DATA STORAGE SERVER

(75) Inventors: Earle Ellsworth, Benson, AZ (US); Chad Seaton Mitchell, Tucson, AZ (US); David Michael Morton, Tucson, AZ (US); Omar Bond Vargas, Port Orange, FL (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/255,506

(22) Filed: Oct. 21, 2005

(65) Prior Publication Data

US 2007/0094294 A1    Apr. 26, 2007

(51) Int. Cl.
  *G06F 12/00* (2006.01)
  *G06F 17/30* (2006.01)
(52) U.S. Cl. .................................................. 707/634
(58) Field of Classification Search ................ 707/102, 707/101, 205
  See application file for complete search history.

(56) References Cited

U.S. PATENT DOCUMENTS

| | | | |
|---|---|---|---|
| 6,173,415 B1 * | 1/2001 | Litwin et al. ................ 714/7 |
| 6,240,416 B1 * | 5/2001 | Immon et al. ................ 707/10 |
| 6,530,008 B1 * | 3/2003 | Lin et al. ..................... 711/171 |
| 6,557,039 B1 | 4/2003 | Leong et al. ................ 709/229 |
| 6,564,252 B1 * | 5/2003 | Hickman et al. ............ 709/214 |
| 7,062,542 B1 * | 6/2006 | Reddy et al. ................ 709/219 |
| 7,293,012 B1 * | 11/2007 | Solaro et al. ................... 707/2 |
| 2002/0178439 A1 | 11/2002 | Rich et al. ................... 717/174 |
| 2003/0217068 A1 * | 11/2003 | Fruchtman et al. .......... 707/101 |

FOREIGN PATENT DOCUMENTS

| CN | 1617139 A | 5/2005 |
|---|---|---|
| JP | 2000251006 A | 10/1999 |

* cited by examiner

*Primary Examiner*—Greta L Robinson
*Assistant Examiner*—Jeffrey Chang
(74) *Attorney, Agent, or Firm*—Kunzler Needham Massey & Thorpe

(57) ABSTRACT

An apparatus, system, and method are disclosed for autonomically virtualizing a data storage server. The apparatus, system, and method include a central control hub module configured to service storage server operations between a client and one or more storage servers, a detection module configured to determine whether a set of storage conditions is satisfied, and a creation module configured to create an additional instance of a storage server in response to the set of storage conditions being satisfied. The central control hub module may also include a mapping module configured to maintain storage mappings between the client and servers and provide the storage mappings to the client. When a new server instance is created, it may include a new maintenance database instance.

18 Claims, 5 Drawing Sheets

APPARATUS, SYSTEM, AND METHOD FOR THE AUTONOMIC VIRTUALIZATION OF A DATA STORAGE SERVER

BACKGROUND OF THE INVENTION

1. Field of the Invention

This invention relates to data storage systems and more particularly relates to the autonomic expansion and virtualization of data storage servers.

2. Description of the Related Art

Modern technology has led to the heavy reliance of businesses on electrical data storage systems. These storage systems are used to backup and archive critical information that must be stored and retrieved quickly and reliably. Typically, a storage system includes a remote server or group of servers that are accessible by any number of clients across a common network. The storage servers may utilize storage devices such as magnetic disks, optical disks, and magnetic tape subsystems to store vast amounts of operational, backup, and archive data for the clients. Management software is typically used to configure a maintenance database that records metadata describing the files stored on backend storage devices. Typically, these maintenance databases identify a file location, which client the file belongs to, and the date a file was stored, created, or modified. These maintenance databases may have a limited size defined by the management software being used. Typically, a new maintenance database must be created when one of the existing maintenance databases reaches its capacity. This usually requires the manual configuration of a new server as well as the reconfiguration of each affected client which may result in high monetary costs and a loss of production.

In one embodiment, TSM (Tivoli Storage Manager) software, provided by IBM of Armonk, N.Y., is used to manage a backup or archive system by maintaining a maintenance database of the files stored on a particular server. A TSM server maintenance database may have an upper size limit of 530 Gigabytes, and for best performance and maintainability, may be limited to approximately 100 Gigabytes. The size of a maintenance database is calculated by determining the number of files that will fill a given configuration and multiplying that value by the size of each entry. Assuming no storage pool backups will be required and no files are aggregated, the size of a typical maintenance database entry is approximately 600 bytes, although this number could vary due to file size or file name. Therefore, a server with 12 Terabytes of storage and an average file size of 10 Kilobytes will require an 840 Gigabyte maintenance database which exceeds the 530 Gigabyte limit.

In another embodiment, maintenance database size is figured as a percentage of the total storage space available. Using TSM software, the maintenance database size limit is typically one to five percent of the total storage capacity. The tables provided below list the maintenance database size requirements for various storage capacities.

Maintenance database Size Requirements
Calculations using 600 bytes/file

|  |  | Total Backend Storage | | | | |
|---|---|---|---|---|---|---|
|  |  | 3 TB | 6 TB | 12 TB | 21 TB | 48 TB |
| Average File Size | 10 KB | 210 GB* | 420 GB* | 840 GB** | 1.47 TB** | 3.36 TB** |
|  | 100 KB | 21 GB | 42 GB | 84 GB | 147 GB* | 336 GB* |
|  | 250 KB | 8.4 GB | 16.8 GB | 33.6 GB | 58.8 GB | 134.4 GB* |
|  | 500 KB | 4.2 GB | 8.4 GB | 16.8 GB | 29.4 GB | 67.2 GB |
|  | 1 MB | 2.1 GB | 4.2 GB | 8.4 GB | 14.7 GB | 33.6 GB |
|  | 2 MB | 1.05 GB | 2.1 GB | 4.2 GB | 7.35 GB | 16.8 GB |

Maintenance database size requirements
Calculations using % of storage capacity

|  | Total Backend Storage | | | | |
|---|---|---|---|---|---|
|  | 3 TB | 6 TB | 12 TB | 21 TB | 48 TB |
| 1% | 30 GB | 60 GB | 120 GB* | 210 GB* | 480 GB* |
| 5% | 150 GB | 300 GB* | 600 GB** | 1.2 TB** | 2.4 TB** |

*Exceeds TSM's practical maintenance database size limit of 100 GB
**Exceeds TSM's maximum maintenance database size limit of 530 GB As demonstrated in the tables above, a single maintenance database is insufficient in many cases to manage a large storage area. In a typical archive environment, these maintenance databases may reach their maximum capacity or exceed their ideal operating capacity. Particularly in a data retention environment, the data could be retained for long periods of time, thereby not freeing up maintenance database space and leading to size and efficiency problems. Currently, the remedy for these problems is to manually configure new servers with new maintenance databases, and then bring these new servers online which can be extremely costly in terms of money and production.

FIG. 1 is a schematic block diagram illustrating a conventional data storage system 10. A Client 12 connects to a server instance 14. The server instance 14 accesses the back end storage 16 and includes a maintenance database 18. The Client 12, in various embodiments, may comprise a personal computer, workstation, laptop or other device as will be recognized by one skilled in the art. The back end storage 16 may include disk storage devices, tape storage devices, a storage sub-system, or other storage devices or combination of storage devices as will be recognized by one skilled in the art. Maintenance database 18 is used to store metadata corresponding to the data stored in the back end storage 16. The metadata, in one embodiment, may include information such as file name, location, and size, as well as dates the file was stored or accessed.

The server instance 14 may service multiple clients and may service storage operations for each of them. The client 12 may be connected to the server instance 14 through a local area network (LAN), and the server instance 14 maybe connected to the back end storage 16 through a storage area network (SAN). As described above, one problem with current configurations is that the maintenance database 18 may reach or exceed a capacity threshold requiring the manual implementation of a new server and maintenance database.

From the foregoing discussion, it should be apparent that a need exists for an apparatus, system, and method that autonomically virtualizes a data storage server by creating new server instances and maintenance databases as needed. Beneficially, such an apparatus, system, and method would increase the performance and reliability of the system, eliminate maintenance database size limit problems, and significantly reduce the number of manual configuration steps required to expand the storage system.

SUMMARY OF THE INVENTION

The present invention has been developed in response to the present state of the art, and in particular, in response to the problems and needs in the art that have not yet been fully solved by currently available data storage solutions. Accordingly, the present invention has been developed to provide an apparatus, system, and method for the virtualization of a data storage server that overcome many or all of the above-discussed shortcomings in the art.

The apparatus to autonomically virtualize a data storage server is provided with a logic unit containing a plurality of modules configured to functionally execute the necessary steps of autonomic server creation. These modules in the described embodiments include a central control hub module configured to service storage server operations between a client and one or more storage servers; a detection module configured to determine whether a set of storage conditions is satisfied; and a creation module configured to create an additional instance of a storage server in response to the set of storage conditions being satisfied.

The apparatus, in one embodiment, is configured to maintain storage mappings between the client and one or more servers and provide the storage mappings to the client. In another embodiment, the apparatus is configured to respond to a storage operation command received from the client including: interpreting the storage operation command, interacting with one or more servers in response to the operation command, compiling return data from the one or more storage servers, manipulating the return data based on the storage operation command, and returning result data to the client.

The apparatus is further configured, in one embodiment, to operate using standard storage operation commands, such that storage server operations serviced by the central control hub module are transparent to at least one of the client and the one or more servers. In another embodiment, the additional instance of a storage server includes a new instance of a storage maintenance database associated with the storage server, and the set of conditions includes the exceeding of a storage maintenance database threshold.

In a further embodiment, the apparatus may be configured to create an additional instance of a storage agent corresponding to the additional instance of a storage server.

A system of the present invention is also presented for the autonomic virtualization of a data storage server. In particular, the system, in one embodiment, includes one or more data storage servers; a client in electronic communication with the one or more servers; a central control hub module configured to service storage server operations between the client and the one or more servers; a detection module configured to determine whether a set of storage conditions is satisfied; and a creation module configured to create an additional instance of a storage server in response to the set of storage conditions being satisfied.

The system may further include an additional instance of a storage agent corresponding to the additional instance of a storage server. The system may also include a mapping module configured to maintain storage mappings between the client and the one or more servers and provide the storage mappings to the client; and a response module configured to respond to a storage operation command received from the client. The response module may include an interpretation module configured to interpret the storage operation command; an interaction module configured to interact with the one or more servers in response to the storage operation command; a compilation module configured to compile return data from the one or more storage servers; and a result module configured to manipulate the return data and provide the results to the client.

A method of the present invention is also presented for the autonomic virtualization of a data storage server. The method in the disclosed embodiments substantially includes the steps necessary to carry out the functions presented above with respect to the operation of the described apparatus and system.

A method of the present invention is also presented for deploying computing infrastructure configured to autonomically virtualize a data storage server. The method in the disclosed embodiments includes: deploying software including a plurality of modules, the modules configured to service storage server operations between a client and one or more storage servers, determining whether a set of storage conditions is satisfied, and creating an additional instance of a storage server in response to the set of storage conditions being satisfied. The method may also include configuring the set of storage conditions according to customer requirements.

In a further embodiment, the method includes analyzing a server storage system comprising a client and one or more servers connected by a storage network, determining whether the system can benefit from a virtual data storage server, and testing the deployed software to ensure proper functionality.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or maybe learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
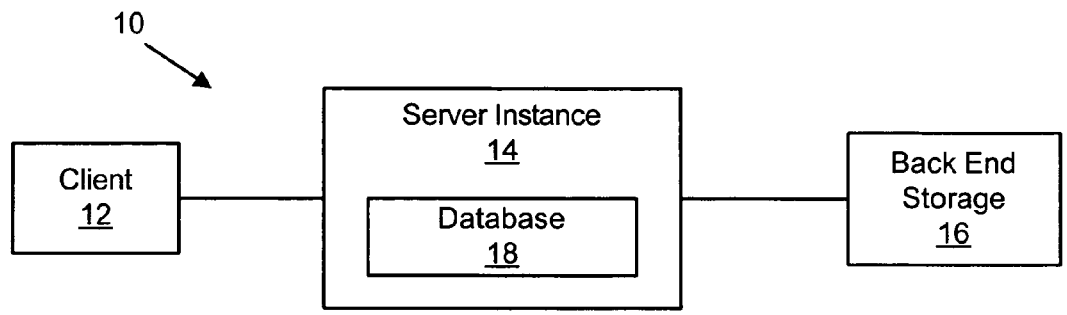
FIG. 1 is a schematic block diagram illustrating a conventional data storage system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. As used herein, the term "autonomic" means to occur with little or no user intervention, possibly in response to a stimulus. The term "storage server" refers to the software and hardware comprising a server that is typically used for the storage and maintenance of electronic data. The term "instance of storage server" refers to a specific occurrence of a storage server, and may be a clone of another storage server.

Furthermore, the described features, structures, or characteristics of the invention may be combined in any suitable manner in one or more embodiments. In the following description, numerous specific details are provided, such as examples of programming, software modules, user selections, network transactions, maintenance database queries, maintenance database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
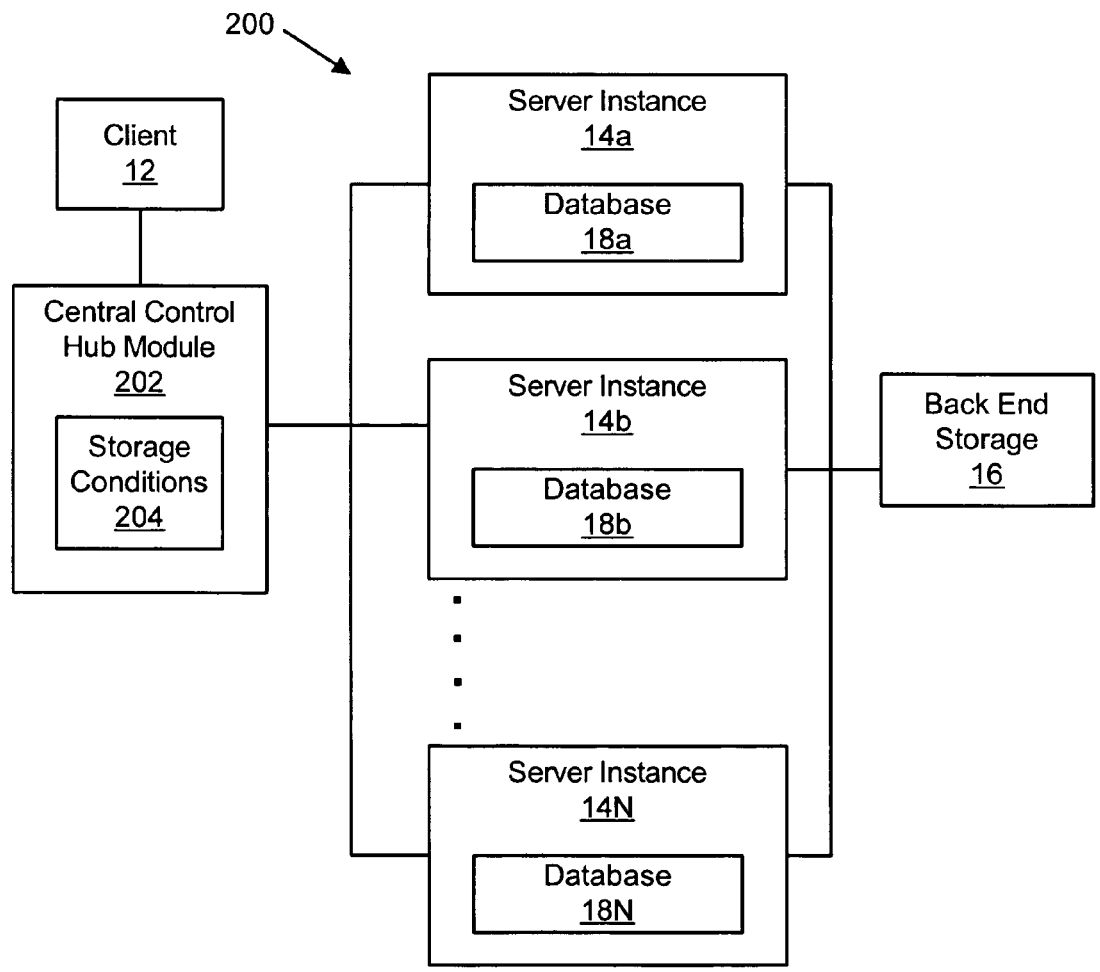
FIG. 2 is a schematic block diagram illustrating one embodiment of a data storage system in accordance with the present invention.

FIG. 2 illustrates one embodiment of a system 200 for autonomically virtualizing a data storage server. A client 12, in one embodiment, is connected to a central control hub module 202 which is connected to one or more server instances 14a-N, each server instance 14a-N including a maintenance database 18a-N. The one or more server instances 14a-N are connected to a back end storage 16.

The system 200 includes a central control hub module 202. The central control hub module 202 may contain a plurality of logic modules to service storage server operations between one or more clients 12 and one or more server instances 14a-N. In one embodiment, the central control hub module 202 allows the client 12 to communicate with a plurality of server instances 14a-N as though the client 12 was communicating with a single server such that the communications are transparent to at least one of the client 12 or server instances 14a-N. Transparency means the client 12, for example, is unaware that the client 12 is communicating with more than one of the server instances 14a-N. In an alternate embodiment, the central control hub module 202 simply facilitates communications between the client 12 and the server instances 14a-N individually. In this embodiment, the central control hub 202 directs communications from the client 12 to the appropriate server instance 14a. Additionally, in one embodiment, the central control hub module 202 may be implemented on a separate piece of hardware, or in another embodiment, may share hardware with a server instance 14a-N or other software module.

The central control hub module 202, in one embodiment, contains the logic necessary to autonomically create additional instances of a server 14a. For example, the central control hub module 202 may determine according to the set of storage conditions 204 whether an additional server instance 14b is needed. If so, the central control hub module 202 creates a second server instance 14b. In one embodiment, the central control hub module 202 clones a server instance 14a to create a server instance 14b. Preferably, the cloned server instance 14b utilizes substantially the same policy, user, and administration information as the original server instance 14a. In another embodiment, central control hub module 202 may generate a server instance 14b that is substantially different from server instance 14a. The process may be repeated an indefinite number of times as depicted by the creation of server instances 14a-N and its associated maintenance databases 18a-N.

The set of storage conditions 204 indicates the need for an additional server instance 14b. In various embodiments, the set of storage conditions 204 may comprise, but is not limited to, factors including the amount of used storage space in the maintenance database 18a, the amount of storage space remaining in the maintenance database 18a, a detected error in the system, storage processing load, or other condition as defined by a user.

In one embodiment, the creation of an additional server instance 14b is triggered by a storage condition such as the reaching or exceeding of a size threshold by the maintenance database 18a. For example, the maintenance database 18a may be nearing its maximum capacity or may have surpassed its optimal operating size. The newly created additional server instance 14b includes an additional maintenance database 18b which the central control hub module 202 may use to reduce the load on database 18a. For example, in one embodiment, the central control hub module 202 moves a percentage of the data stored on server instance 14a to the new server instance 14b, or in an alternate embodiment, all future data is directed to the new server instance 14b allowing the client 12 to have data stored on both server instances 14a-b. In another embodiment, communications from all new clients 12 are directed to the new server instance 14b rather than server instance 14a.

In one embodiment, the central control hub module 202 operates within a Local Area Network (LAN) environment wherein the client 12 communicates with the server instances 14a-N across the LAN. The client 12 establishes communications with the central control hub module 202, such that during sign-on and authentication, a handshake can be incorporated to acquire information regarding the client's 12 primary server 14a along with any secondary servers 14b-N that contain the client's metadata. This allows client 12 to communicate with the one or more servers 14a-N through the central communication hub 202 in a transparent manner, or alternately, to communicate directly with the server instances 14a-N.

Figure 3A:
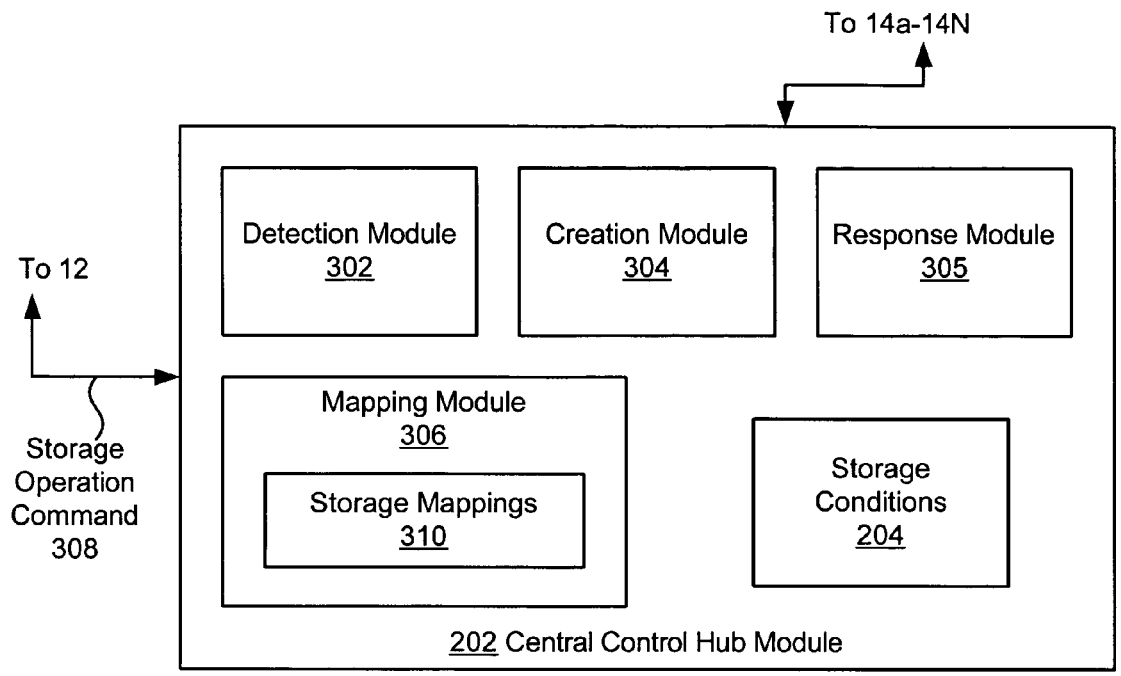
FIG. 3A is a schematic block diagram illustrating one embodiment of a central control hub module in accordance with the present invention.

FIG. 3A illustrates one embodiment of central control hub module 202 comprising a detection module 302, a creation module 304, a response module 305, a mapping module 306, and a set of storage conditions 204. Preferably, the central control hub module 202 services storage server operations between one or more clients 12 and one or more server instances 14a-N. In addition, the central control hub module 202 is configured to spawn additional server instances 14b-N and facilitate communications between the one or more clients 12 and the new server instances 14b-N.

In one embodiment, the detection module 302 determines whether a storage condition within the set of storage conditions 204 is met. Satisfying one of the conditions in the set of storage conditions 204 typically indicates a need for an additional server instance 14b. For example, one storage condition 204 may indicate a maintenance database 14a size threshold. Another storage condition 204 may define a server load threshold. Alternatively, a combination of related storage conditions 204 may be required to trigger the creation of an additional server instance 14b. In certain embodiments, the set of storage conditions 204 may be changed or reconfigured by user or computer input.

In order to detect when a storage condition 204 has been met, the detection module 302 monitors the server instances 14a-N. Preferably, the mapping module 306 periodically stores updated storage condition information, such as maintenance database size, on the central control hub 202. The detection module 302 accesses the storage condition information to determine whether one of the storage conditions 204 has been met. In another embodiment, detection module 302 periodically tests for the occurrence of a storage condition 204. For example, central control hub module 202 may periodically query the server instances 14a-N to prompt a response from each server instance 14a-N indicating whether or not a storage condition 204 has been met. In yet another embodiment, each server instance 14a-N is configured to notify detection module 302 when one of the storage conditions 204 is satisfied. In this manner, storage conditions 204 are automatically checked to determine when a new server instance 14a-N is required.

The creation module 304 creates the additional server instances 14b-N in response to a signal from the detection module 302 indicating that one or more storage conditions 204 have been satisfied. In one embodiment, the creation module 304 creates additional server instances 14b-N in response to user input from a management console (not shown). In another embodiment, the new server instance 14b is cloned from another existing server instance 14a utilizing substantially the same policy, user, and administration information. Preferably, the new server instance 14b is generated using software available to, or stored within, the central control hub 202. Once the new server instance 14b is generated, the creation module 304 configures it by copying settings from another server instance 14a or, in another embodiment, reading configuration settings from a file or script. Additionally, the creation module 304 initiates communications between the new server instance 14b, the client 12, and the central control hub 202. In one embodiment, the new server instance 14b is created with its own policy, user, and administration information as defined by a user.

The response module 305 and the mapping module 306, including the storage mappings 310, are described in detail below.

Figure 3B:
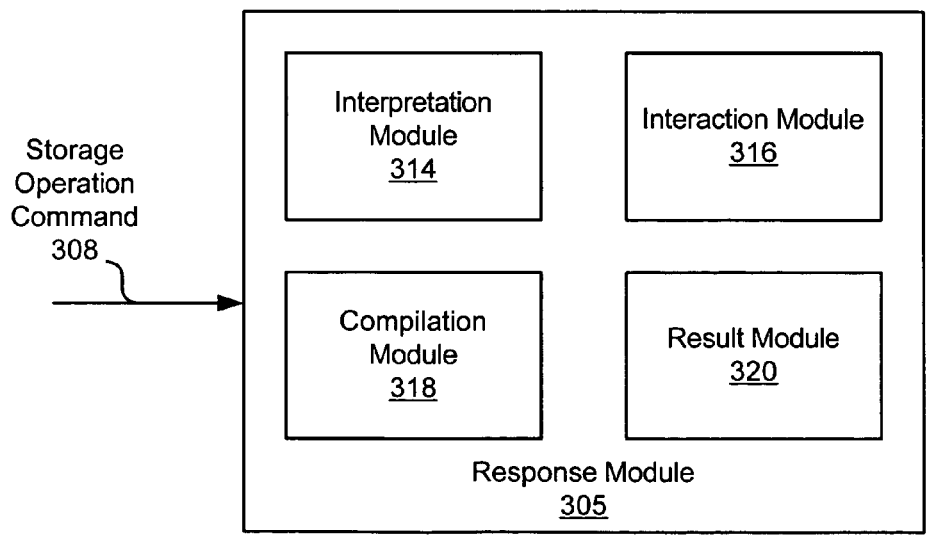
FIG. 3B is a schematic block diagram illustrating one embodiment of a response module in accordance with the present invention.

FIG. 3B is a schematic block diagram illustrating one embodiment of response module 305 in accordance with the present invention. The response module 305 includes an interpretation module 314, interaction module 316, compilation module 318, and result module 320. Preferably, the response module 305 is configured to facilitate communications between the client 12 and the server instances 14a-N by responding to a storage operation command 308 received from the client 12. The storage operation commands 308 include the typical communications between a client 12 and a storage server instance 14a such as query, restore, or other storage operation commands as will be recognized by one skilled in the art.

The interpretation module 314 is configured to interpret the storage operation command 308. For example, the client 12 may send a query request, or restore command to the central control hub module 202. The interpretation module 314 receives the command and sends a corresponding signal to the interaction module 316. The interaction module 316 interacts with one or more server instances 14a-N in response to the storage operation command 308. For example, if a query request, or other standard storage operation command 308, were received by the central control hub module 202, the interaction module 316 sends a corresponding command to each of the appropriate server instances 14a-N allowing the client 12 to communicate with multiple serve instances 14a-N in a transparent fashion.

The compilation module 318 compiles return data from the server instances 14a-N and, in one embodiment, may present the data to the client 12 as though client 12 were communicating directly with a single server instance 14a. The result module 320 manipulates the return data based on the storage operation command 308 and returns the manipulated result data to client 12. For example, result module 312 may sort the result data, exclude duplicate active objects, or return only the most recent result data to the client 12. The result data may also include metadata such as which server instance 14a-N maintains the requested data. The metadata may allow the client 12 to issue other operation commands such as restore or retrieve directly to that server instance 14a.

In another embodiment, the central control hub module 202 receives a query command from the client 12 and instead of compiling and returning result data to the client 12, the central control hub 202 may serve as a proxy by directing the queries and client information to each server instance 14a-N. Consequently, the individual server instances 14a-N involved may send data results directly to the client 12. The client 12 may then compile and process the return data.

Figure 4:
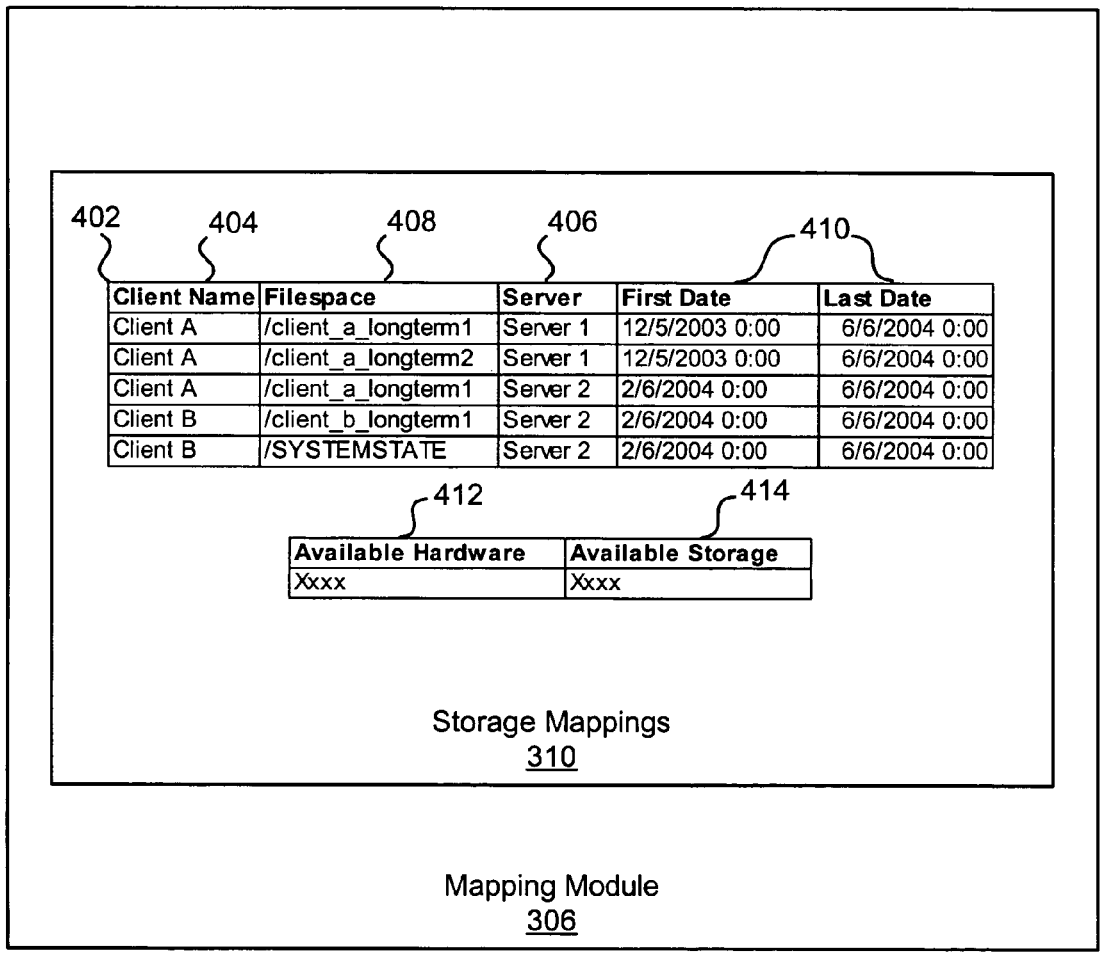
FIG. 4 is a schematic block diagram illustrating one embodiment of a mapping module in accordance with the present invention.

FIG. 4 is a schematic block diagram illustrating one embodiment of a mapping module 306 in accordance with the present invention. The mapping module 306 is configured to maintain storage mappings 310 between the client 12 and the one or more server instances 14a-N and provide the storage mappings to the client 12. The mapping module 306 may include client-to-server mappings 402 that contain information such as which clients 404 own data on which server instances 406, which filespaces 408 are stored on which servers instances 406, and point-in-time information 410 identifying when the mapping data was stored and when the mapping data was last modified.

Also included in the storage mappings 310 is information indicating the availability of hardware 412 and storage space availability 414 that may be used in the creation of additional server instances 14a-N. However, the storage mappings 310 are not limited to these categories and may include more or less information about the client-to-server relationship. As depicted, the storage mapping 310 shows information for two clients and two servers. Client A has two filespaces on server 1 and one filespace on server 2. Client B has two filespaces located on server2 one of which is for long term storage and another for system state backups indicated by the filespace name. This information is used by the central control hub 202 to service standard storage operation commands 308 between the client 12 and the server instances 14a-N.

In one embodiment, the client 12 may query the central control hub module 202 for filespaces 408 the client 12 wants to query from, including point-in time information 410. The mapping module 306, in one embodiment, searches the client-to-server mappings 402 and returns a list of filespace-to-server responses to the client 12. The client 12 can then issue individual queries to each of the server instances 14a-N included in the list of filespace-to-server responses and compile the results in order to present the user with a transparent view.

In one embodiment, the client 12 on start up may query the mapping module 306 to identify where data owned by the client 12 is stored. The metadata returned by the mapping module 306 may indicate server information such as server name, communication method, communication info, etc. for a plurality of servers. The client 12 may store this metadata in memory. The client 12 may reference this metadata to communicate directly with a server instance 14a if needed. New information may be added to the memory when a new server instance 14b-N is created by the creation module 304.

For server authentication in various embodiments, passwords maybe stored in the central control hub module 202, synchronized across the server instances 14a-N, or moved to some entity outside the server instances 14a-N. If the passwords for accessing a plurality of server instances 14a-N are stored on the central control hub module 202, the client 12 may authenticate with the central control hub 202 just as authentication was handled using conventional server managing software such as Tivoli Storage Manager. In one embodiment, the client 12 authenticates with the central control hub 202 as though the central control hub 202 were a server instance 14a. The central control hub 202 then sends a session key to all the appropriate server instances 14a-N, and an authentication success/failure is returned to the client 12. The session key is then used to encrypt data communicated directly between client 12 and the server instances 14a-N.

Figure 5:
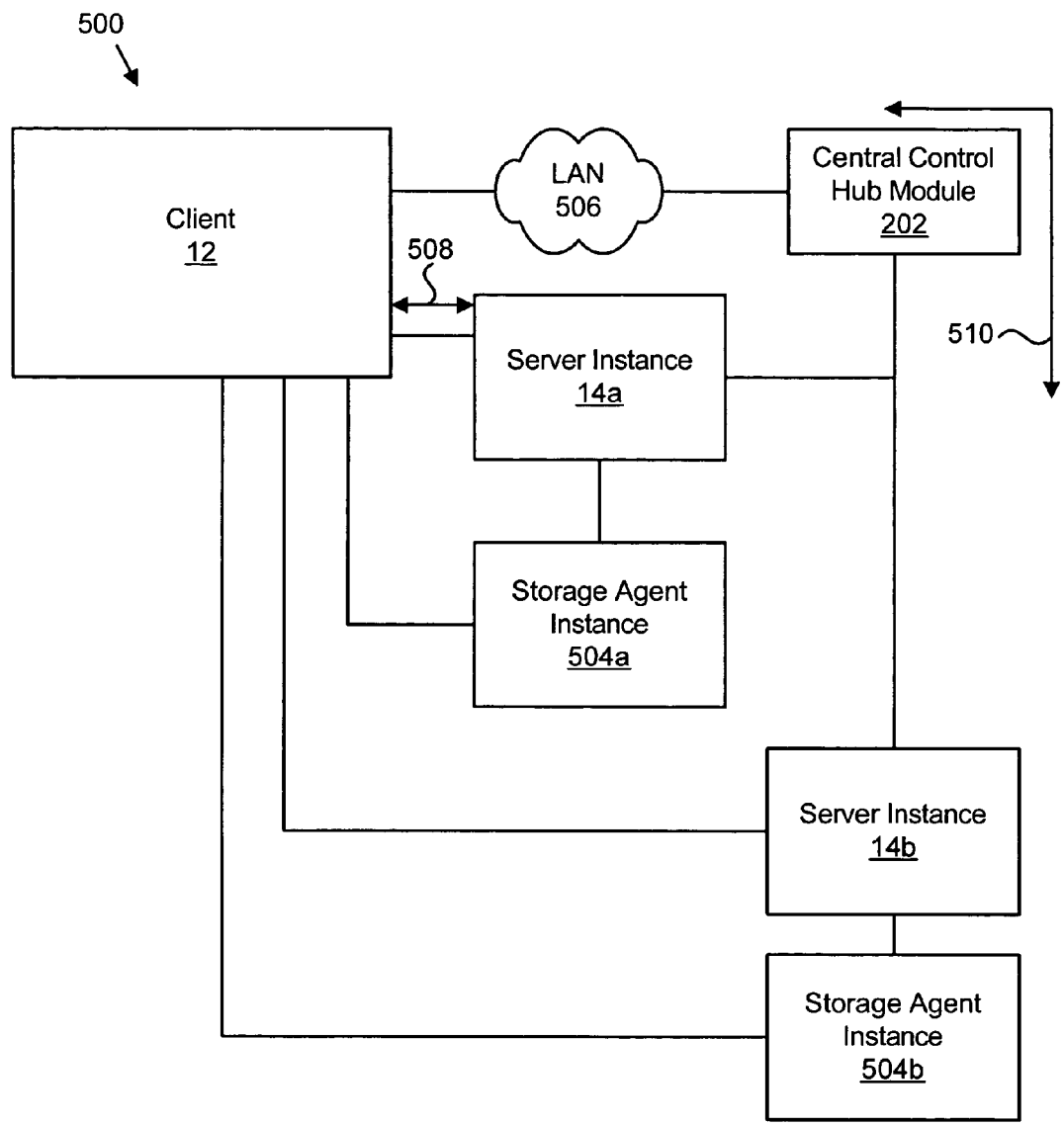
FIG. 5 is a schematic block diagram illustrating one embodiment of a data storage system in a LANfree environment in accordance with the present invention.

FIG. 5 is a schematic block diagram illustrating one embodiment of a data storage system 500 in a LANfree environment. The storage agents 504a-b facilitate communication over a LANfree path as will be recognized by one skilled in the art. A LANfree path 508 is a communication path that bypasses the LAN 506 and allows data to be transferred directly between a client 12 and a server instance 14a. Advantageously, the LANfree path reduces the load on the LAN 506. A LAN path 510 is a communication path that includes the components and members of a LAN 506. In one embodiment, the central control hub module 202 is accommodated similarly to a storage agent, but services LAN pathway communications between the client 12 and the server instances 14a and 14b.

Typically, in a LANfree environment, the client 12 connects to the storage agent 504a by executing a handshaking protocol to obtain the appropriate server instance information. Once the server instance information is obtained, the client 12 connects to that server instance 14a without assistance from a storage agent 504a. In one embodiment of the present invention, the client's data may be stored on multiple server instances 14a-N, each with a corresponding storage agent instance 504a-N. The mapping module 306 (see FIG. 3) may include client-to-storage agent mapping information that allows the client 12, in one embodiment, to initiate communications with the central control hub module 202 and query for the appropriate storage agent information. For example, the storage mappings 310 may include a storage agent instance 504a corresponding to each server instance 406 such that each client 402 is mapped to one or more storage agents 504a-b and one or more server instances 406. Once the query result is returned to the client 12, the client 12 can initiate communication with the appropriate storage agent instance 504a, and the storage operation commands 308 can continue as usual. In a LANfree environment, when an additional server instance 14b-N is created, the central control hub 202 may also create an associated storage agent 504b corresponding to the additional server instance 14b-N.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
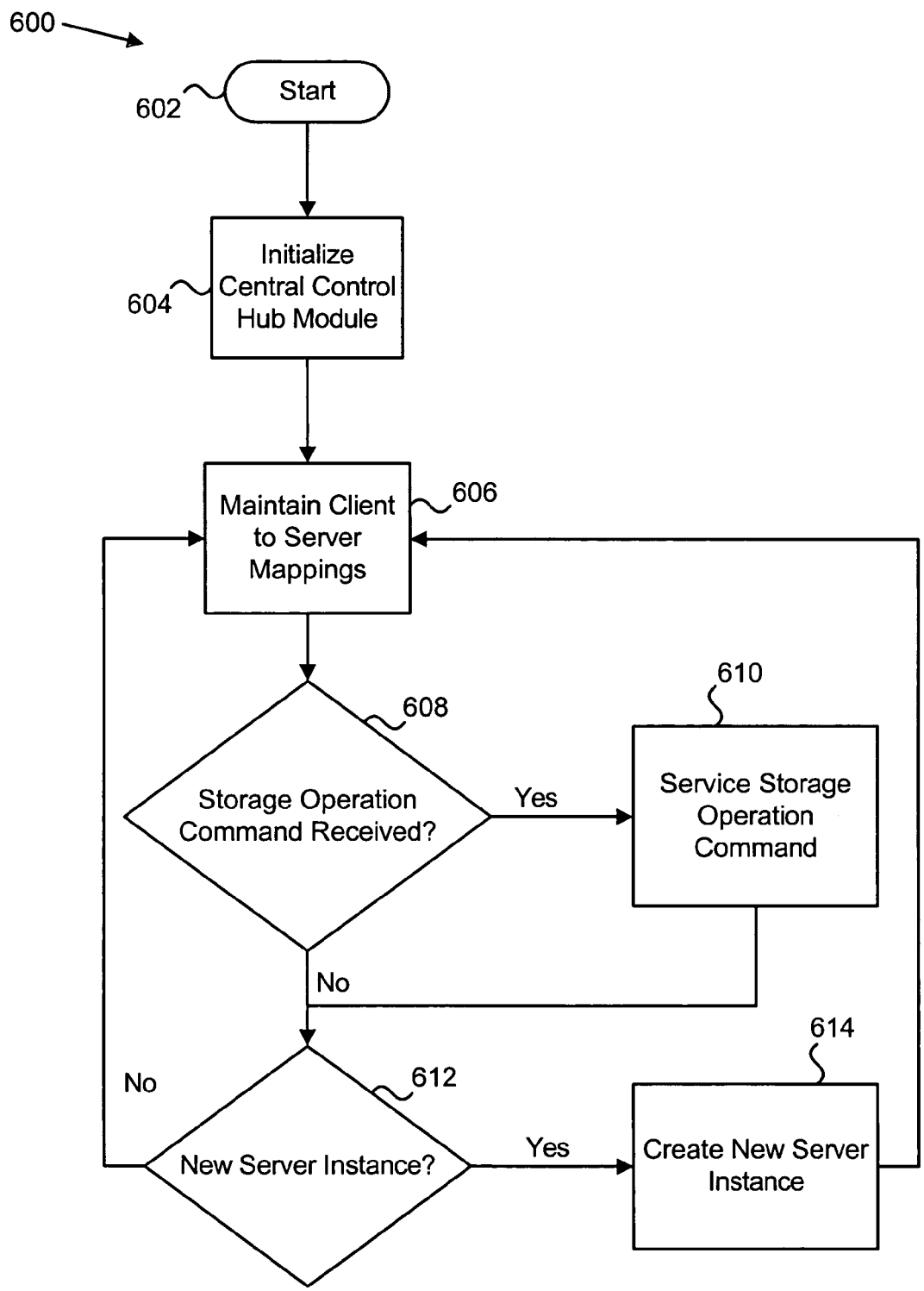
FIG. 6 is a schematic flow chart diagram illustrating one embodiment of a data storage server virtualization method in accordance with the present invention.

FIG. 6 is a schematic flow chart illustrating one embodiment of a method 600 for the virtualization of a data storage server 14 in accordance with the present invention. The method 600 starts 602 and the central control hub module 202 is initialized 604. Initializing the central control hub module 202 in various embodiments may include, but is not limited to, providing power to the central control hub 202, executing a handshake protocol with the central control hub 202, or establishing communications between the client 12 and the central control hub module 202. In one embodiment, the central control hub module 202 services storage server operations between the client 12 and the one or more server instances 14a-N such that the operations are transparent to at least one of the clients 12 and the one or more servers 14a-N. Advantageously, such transparency provides a plurality of additional storage servers 14a-N dynamically and without software changes to the client 12 or the server instances 14a-N. Consequently, limitations imposed by size constraints of maintenance databases 18a-N are overcome.

In one embodiment, the central control hub module 202 maintains 606 client-to-server mappings 402 by logging information about the relationship between each client 12 and each server instance 14a-N connected to the central control hub module 202. The client-to-server mappings 402 may include information such as which clients 404 have files stored on which servers 406, where a client's filespaces 408 are located, and when a client's files were stored 410 or last accessed 410. The mappings 402 may also include information about storage agents 504a, available hardware 412, and available storage space 414.

Next, the central control hub module 202 determines 608 that a storage operation command 308 has been received. If so, the central control hub module 202 services 610 the storage operation command 308 in place of a server instance 14a or directs the storage operation command 308 to the appropriate server instance 14a-N for processing. Servicing storage operation commands 308 may include responding to a query, restore/retrieve command, backup/archive command, server authentication requests or other storage operations commands 308 as will recognized by one skilled in the art. Consequently, the central control hub module 202 may interpret the storage operation command, interact with the one or more server instances 14a-N, compile return data from the one or more server instances 14a-N, and manipulate the return data in order to provide suitable results to the client 12. In another embodiment, the central control hub module 202 may provide mapping information directly to the client 12 to allow the client 12 to communicate directly with the appropriate server instance 14a-N.

Next, the central control hub module 202 determines 612 whether a new instance of a server 14b-N is needed. The central control hub module 202 evaluates a set of storage conditions 204. If the storage conditions 204 are satisfied, the central control hub module 202 creates 614 a new server instance 14b. The new server instance 14b may be created, in one embodiment, by executing software defining a new server instance 14b that is available to the central control hub module 202. In another embodiment, the new server instance 14b may be cloned from an existing server 14a and may utilize substantially the same policy, user, and administration information. The new server instance 14b may also include a new instance of a storage maintenance database 18b associated with the new server instance 14b. Next the method 600 returns to maintaining 606 client-to-server mappings 402. If a new server instance is not needed 612, the central control hub module 202 continues to maintain client-to-server mappings 606.

The present invention also includes a method for deploying computing infrastructure configured to autonomically virtualize a data storage server. In one embodiment, software is deployed including a plurality of modules to service storage server operations 308 between a client 12 and one or more storage servers 14a-N, determining whether a set of storage conditions 204 is satisfied, and creating an additional instance of a storage server 14b-N in response to the set of storage conditions 204 being satisfied. The method may also include configuring the set of storage conditions 204 according to customer requests. The set of storage conditions 204, in various embodiments, may include the current storage maintenance database 18a exceeding a size threshold or a server workload exceeding a server load threshold.

In one embodiment, the method also includes analyzing a server storage system 200 comprising a client 12 and one or more servers 14a-N connected by a storage network, determining whether the system 200 can benefit from a virtual data storage server, and testing the deployed software to ensure proper functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to autonomically virtualize a storage server, the apparatus comprising:
    a memory device storing executable code;
    a processor executing the executable code, the executable code comprising
    a central control hub module servicing storage server operations between a client and one or more virtual storage server instances, each virtual storage server instance accessing files on a back end storage and comprising only one maintenance database storing metadata describing files managed by the virtual storage server instance;
    a detection module determining when a first maintenance database exceeds a size threshold measured in bytes of first maintenance database storage; and
    a creation module creating an additional virtual storage server instance comprising a second maintenance database in response to the first maintenance database exceeding the size threshold.

2. The apparatus of claim 1, the executable code further comprising a mapping module maintaining storage mappings between the client and the one or more virtual storage server instances and providing the storage mappings to the client.

3. The apparatus of claim 1, the executable code further comprising a response module responding to a storage operation command received from the client, the response module comprising:
    an interpretation module interpreting the storage operation command; and
    an interaction module interacting with the one or more virtual storage server instances in response to the storage operation command.

4. The apparatus of claim 1, wherein the executable code further comprises:
- a compilation module compiling return data from the one or more virtual storage server instances; and
- a result module manipulating the return data based on a storage operation command and returning result data to the client.

5. The apparatus of claim 1, wherein the central control hub module operates using standard storage operation commands, such that storage server operations serviced by the central control hub module are transparent to at least one of the client and the one or more virtual storage server instances.

6. The apparatus of claim 1, wherein the additional virtual storage server instance is cloned from an existing virtual storage server instance and utilizes the same policy, user, and administration information.

7. The apparatus of claim 1, the creation module further creating an additional instance of a storage agent corresponding to the additional virtual storage server instance.

8. A system to autonomically virtualize a storage server, the system comprising:
- a client in electronic communication with one or more virtual storage server instances;
- a memory device storing executable code;
- a processor executing the executable code, the executable code comprising
- the one or more virtual storage server instances;
- a central control hub module comprising servicing storage server operations between the client and the one or more virtual storage server instances, each virtual storage server instance accessing files on a back end storage and comprising only one maintenance database storing metadata describing files managed by the virtual storage server instance;
- a detection module determining when a first maintenance database exceeds a size threshold measured in bytes of first maintenance database storage; and
- a creation module creating an additional virtual storage server instance comprising a second maintenance database in response to the first maintenance database exceeding the size threshold.

9. The system of claim 8, the creation module further creating an additional instance of a storage agent corresponding to the additional virtual storage server instance.

10. The system of claim 8, the executable code further comprising a mapping module maintaining storage mappings between the client and the one or more virtual storage server instances and providing the storage mappings to the client.

11. The system of claim 8, the executable code further comprising a response module responding to a storage operation command received from the client, the response module comprising:
- an interpretation module interpreting the storage operation command;
- an interaction module interacting with the one or more virtual storage server instances in response to the storage operation command;
- a compilation module compiling return data from the one or more virtual storage server instances; and
- a result module manipulating the return data based on the storage operation command and providing the results to the client.

12. A memory device storing executable code executed by a processor to perform operations to autonomically virtualize a storage server, the operations comprising:
- servicing storage server operations between a client and one or more virtual storage server instances, each virtual storage server instance accessing files on a back end storage and comprising only one maintenance database storing metadata describing files managed by the virtual storage server instance;
- determining that a first maintenance database exceeds a size threshold measured in bytes of first maintenance database storage; and
- creating an additional virtual storage server instance comprising a second maintenance database in response to the first maintenance database exceeding the size threshold.

13. The memory device of claim 12, the executable code further comprising operations to maintain storage mappings between the client and the one or more virtual storage server instances and provide the storage mappings to the client.

14. The memory device of claim 12, the executable code further comprising operations to respond to a storage operation command received from the client, the operations comprising:
- interpreting the storage operation command;
- interacting with the one or more virtual storage server instances in response to the storage operation command;
- compiling return data from the one or more virtual storage server instances; and
- manipulating the return data based on the storage operation command and providing result data to the client.

15. The memory device of claim 12, wherein the storage server operations comprise standard storage operation commands, such that the storage server operations are transparent to at least one of the client and the one or more virtual storage server instances.

16. The memory device of claim 12, wherein the additional virtual storage server instance is cloned from an existing virtual storage server instance and utilizes the same policy, user, and administration information.

17. A method for deploying computing infrastructure for autonomically virtualizing a storage server, the method comprising:
- servicing, by use of a processor, storage server operations between a client and one or more virtual storage server instances, each virtual storage server instance accessing files on a back end storage and comprising only one maintenance database storing metadata describing files managed by the virtual storage server instance;
- determining when a first maintenance database exceeds a size threshold measured in bytes of first maintenance database storage;
- creating an additional virtual storage server instance comprising a second maintenance database in response to the first maintenance database exceeding the size threshold; and
- configuring the size threshold according to customer requirements.

18. The method of claim 17, further comprising analyzing a server storage system comprising a client and the one or more virtual storage server instances connected by a storage network, determining whether the server storage system can benefit from the additional virtual storage server instance, and testing the additional virtual storage server instance to ensure proper functionality.

* * * * *